Dec. 8, 1959 P. T. FAXEN 2,916,206
GEOMETRICAL BALANCE COMPUTER
Filed March 6, 1957 5 Sheets-Sheet 5

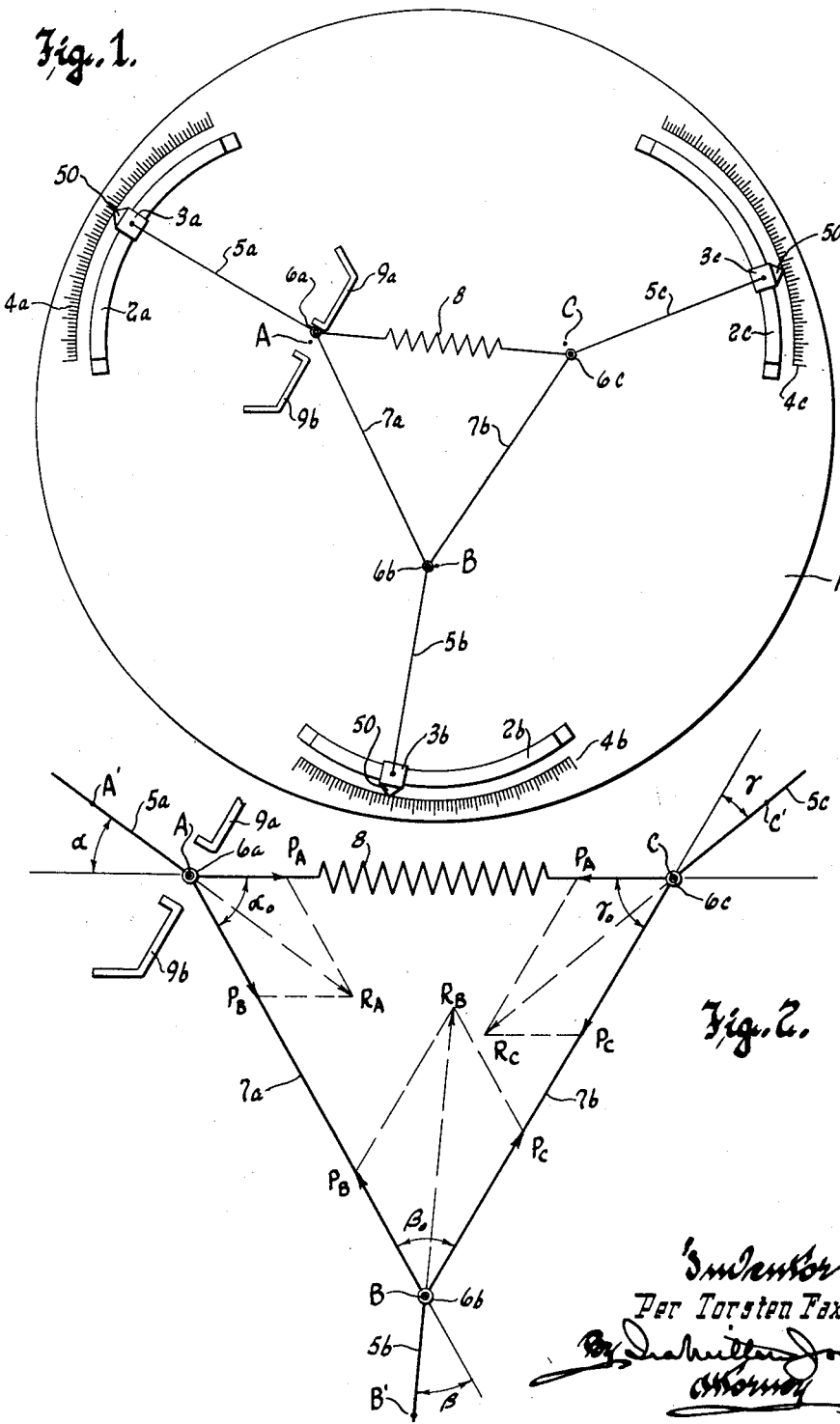

Inventor
Per Torsten Faxén

United States Patent Office 2,916,206
Patented Dec. 8, 1959

2,916,206
GEOMETRICAL BALANCE COMPUTER
Per Torsten Faxen, Jonkoping, Sweden, assignor to Svenska Aeroplan Aktiebolaget, Linkoping, Sweden, a corporation of Sweden
Application March 6, 1957, Serial No. 644,256
Claims priority, application Sweden March 7, 1956
6 Claims. (Cl. 235—61)

This invention relates to computing instruments, and its object is to provide a computing device which, by means of visible or other noticeable signals, will indicate whether a predetermined mathematical relationship between a number of selected values or variables exists or does not exist.

The purpose of the computing instrument of this invention can be to give an impulse to some means which is to be actuated when said relationship exists or does not exist, but the instrument can also be employed to determine the mathematical value of one unknown as a function of a plurality of known values or variables by manual setting of the instrument under the guidance of the signals which it produces.

A known example of a computing instrument of the general type to which this invention pertains is Wheatstone's bridge. In the Wheatstone bridge the resistances $r_1$, $r_2$, $r_3$, and $r_4$ in the four legs of the bridge may be considered the variables, and when the bridge is in a state of balance or equilibrium, their mathematical relationship can be written as in the following equation:

$$\frac{r_1 r_4}{r_2 r_3} = 1$$

As is well known, a difference in potential, which may be either positive or negative, is produced across two junctions of the bridge if this relation is not satisfied, i.e., if the fraction on the left side of the above equation is greater or smaller than 1. This potential difference may, if desired, be employed to effect signalling of the state of unbalance. The Wheatstone bridge can be used, for example, to determine numerically one of the variables if the remaining three are known.

Although the computer of this invention can be employed somewhat in the manner in which a Wheatstone bridge may be employed, it is a further object of this invention to provide a computing device in which the number of values or variables which it can accommodate is not limited to four as is the case in the Wheatstone bridge.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiments of the invention constructed according to the best modes so far devised for the practical application of the principles thereof, and in which:

Figure 1 is a more or less diagrammatic representation of one form of computing device embodying the principles of this invention;

Figure 2 is an enlarged diagrammatic view of the central portion of Figure 1 and illustrating the forces acting on the main elements of the computer.

Figure 3:
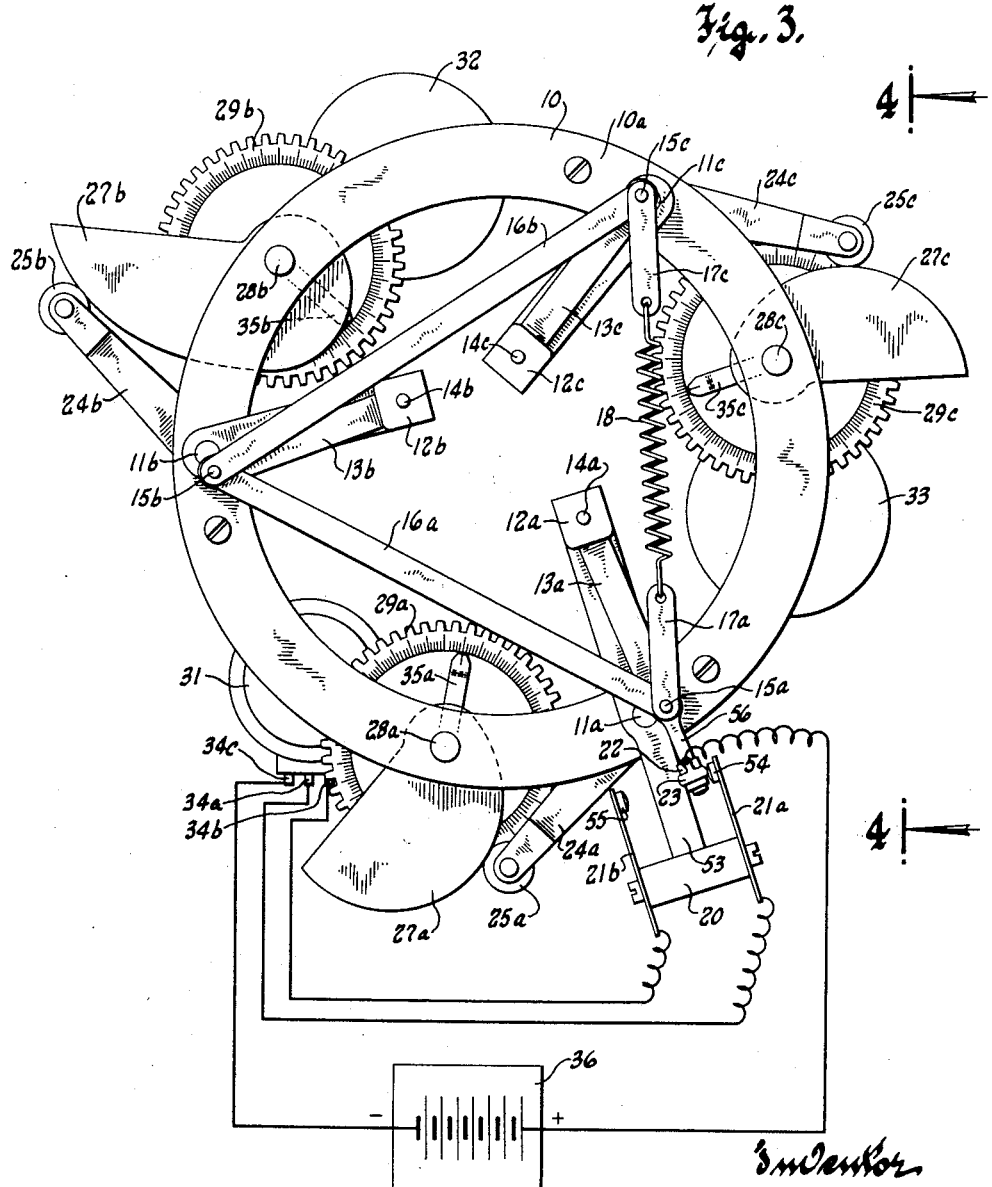
Figure 3 is a plan view of another form of computer.

References will now be made to the accompanying drawings in which like characters have been applied to like parts throughout the several views. The computer more or less diagrammatically illustrated in Figure 1 is adapted for determining whether three manually selected scalable values or variables, $x$, $y$ and $z$ satisfy the mathematical relation $xyz = 1$.

The computer comprises a flat disc or frame 1 having three arcuate rails 2a, 2b and 2c, all of the same curvature, fixed to its upper face at substantially circumferentially equispaced locations near its periphery. The centers of curvature A, B and C of these tracks or rails lie on radii of the disc which divide the disc into three equal sectors. These rails support and guide three setting members or slides 3a, 3b and 3c, one on each of the rails. The slides 3a, 3b and 3c are slidable along their respective rails 2a, 2b and 2c and are thereby moved in arcuate paths about axes which are perpendicular to the top face of the disc 1 and which pass respectively through the centers A, B and C of curvature of the rails.

The slides 3a, 3b and 3c are manually settable in positions corresponding to the selected variables $x$, $y$ and $z$ by means of a pointer 50 on each of the slides, cooperating with an adjacent scale 4a, 4b and 4c engraved in the top face of the disc 1 and on which scale the variables can be read off. A guide member in the form of a flexible and unstretchable thread 5a has one end attached to the slide 3a and its other end attached to a small ring 6a. Similarly, two more guide members 5b and 5c, respectively, have one end attached to the remaining slides 3b and 3c and their other ends attached to two other small rings 6b and 6c. All junction points of the three guide member threads at the slides are assumed for the sake of simplicity to be on the same level above the top face of the disc 1, which, however, is not essential for proper functioning of the device. In addition there are two other flexible and unstretchable threads 7a and 7b, respectively, connected between rings 6a and 6b and rings 6b and 6c. A tension spring 8 is connected under tension between the rings 6a and 6c and together with the threads 7a and 7b forms a centrally disposed three sided geometrical figure substantially in the shape of a triangle.

Each of the five threads 5a, 5b, 5c, 7a and 7b is assumed to be so light that they are held straightly stretched and disposed in a common plane parallel to the plane of the disc 1. The triangle formed by the threads 7a and 7b and by the tension spring 8 will thus float freely above the disc between its suspension points, i.e., the three rings 6a, 6b and 6c. The length of each of the threads 5a, 5b and 5c is so chosen that the centers of the respective rings 6a, 6b and 6c can take a neutral position, by which is meant that position where the rings are coaxial with axes which are perpendicular to the top face of the disc and respectively pass through the points A, B and C representing the centers of curvature of the tracks or rails 2a, 2b and 2c. The length of each of the threads 7a and 7b is also so chosen that the distances between the centers of the rings 6a—6b and 6b—6c are respectively equal to the distances AB and BC in Figure 1. By this, all of the rings 6a, 6b and 6c will take their neutral positions exactly centered over the points A, B and C if one of them does it.

Fixedly mounted on the top face of the disc 1 is an indicating means in the form of two stops 9a and 9b. These stops are located at each side of the center point A for the slide 3a and loosely embrace the ring 6a so that this ring can move only a short distance in a direction parallel to the top face of the disc, with its range of movement limited to slight distances to opposite sides of the neutral position of the ring 6a. In Figure 1 these distances are shown exaggerated for the sake of clarity.

The operation of the computer shown in Figure 1 will now be more fully described with reference to Figure 2, which shows the central portion of Figure 1 at an enlarged scale. Contrary to Figure 1, however, Figure 2 shows the parts in the positions which obtain if the ring 6a and consequently the rings 6b and 6c assume their neutral positions directly over the center points A, B and C. Figure 2 also depicts the force vectors in the triangle formed by the threads 7a—7b and by spring 8. The following references are used:

$A$ = the center point or axis about which the slide 3a travels $B$ = the center point or axis about which the slide 3b travels $C$ = the center point or axis about which the slide 3c travels $A'$ = a point on the thread 5a $B'$ = a point on the thread 5b $C'$ = a point on the thread 5c $\alpha = 180°$ —angle A'AC $\beta = 180°$ —angle B'BA $\gamma = 180°$ —angle C'CB $\alpha_0$ = the angle CAB $\beta_0$ = the angle ABC $\gamma_0$ = the angle BCA $P_A$ = the tension force of the tension spring 8

$P_B$ = the tension force in the thread 7a $P_C$ = the tension force in the thread 7b $R_A$ = the resultant of the forces $P_A$ and $P_B$ $R_B$ = the resultant of the forces $P_B$ and $P_C$ $R_C$ = the resultant of the forces $P_C$ and $P_A$ The angles $\alpha_0$, $\beta_0$ and $\gamma_0$ are approximately constant and called corner angles respectively associated with the setting members or slides 3a, 3b and 3c. The angles, $\alpha$, $\beta$ and $\gamma$ are variables and are called setting angles to the respective setting members. In order to bring the rings 6a, 6b and 6c to a state of equilibrium in their respective neutral positions the following conditions must exist:

$\alpha$ = the angle between the resultant $R_A$ and the line AC $\beta$ = the angle between the resultant $R_B$ and the line BA $\gamma$ = the angle between the resultant $R_C$ and the line CB or, in other words, the guide members threads 5a, 5b and 5c, respectively, must be colinear with resultants $R_A$, $R_B$ and $R_C$. By means of the sine theorem the following equation of equilibrium can thus be set up:

$$\frac{P_B}{\sin \alpha} = \frac{P_A}{\sin (\alpha_0 - \alpha)} \quad (1)$$

$$\frac{P_C}{\sin \beta} = \frac{P_B}{\sin (\beta_0 - \beta)} \quad (2)$$

$$\frac{P_A}{\sin \gamma} = \frac{P_C}{\sin (\gamma_0 - \gamma)} \quad (3)$$

Thus in neutral position:

$$\frac{\sin \alpha}{\sin (\alpha_0 - \alpha)} \cdot \frac{\sin \beta}{\sin (\beta_0 - \beta)} \cdot \frac{\sin \gamma}{\sin (\gamma_0 - \gamma)} = 1 \quad (4)$$

Hence, if:

$$x = \frac{\sin \alpha}{\sin (\alpha_0 - \alpha)} \quad (5)$$

$$y = \frac{\sin \beta}{\sin (\beta_0 - \beta)} \quad (6)$$

$$z = \frac{\sin \gamma}{\sin (\gamma_0 - \gamma)} \quad (7)$$

then from (4) above, $$xyz = 1 \quad (8)$$

The scales 4a, 4b and 4c thus should be graduated in accordance with the respective Formulae 5, 6 and 7. The prescribed condition between the variables $x$, $y$ and $z$ according to Equation 8 will thus be satisfied if the rings 6a, 6b and 6c take their neutral positions directly over their respective center points A, B and C.

It is further seen that the position of the whole chain of links or threads of which the triangle is comprised will be altered if any of the setting angles $\alpha$, $\beta$ and $\gamma$ is changed without making a compensating change in one of the remaining setting angles. Without such a compensating change, one of the resultants $R_A$, $R_B$ or $R_C$ would no longer be colinear with its corresponding guide member thread 5a, 5b or 5c, and a laterally directed disturbing force is produced. This force causes the triangle to rotate substantially around an axis perpendicular to the top face of the disc 1 in the vicinity of the center of the triangle, and simultaneously with such rotation a smaller change in the corner angles $\alpha_0$, $\beta_0$ and $\gamma_0$ and the length of the tension spring 8 occurs. If by this change the setting angle alternately increases and decreases in magnitude, the triangle is caused to rotate alternately clockwise and anticlockwise as seen in Figure 2 whereby the ring 6a will move first towards stop 9a and then towards stop 9b.

The divergencies from the neutral positions of the rings 6a, 6b and 6c may be suitably observed using the position of the ring 6a with respect to its stops 9a and 9b as a reference. In other words it can be visibly ascertained whether the ring 6a is free of the stops, or if this is not the case, the setting of any of the setting members can be adjusted until a state of equilibrium is reached and the computer can thus be used to determine one of the variables if the other two are known.

By altering the graduation of the scales the Equation 8 can be put in another form. If Equation 5 has substituted for it:

$$x = \frac{\sin (\alpha_0 - \alpha)}{\sin \alpha} \quad (5a)$$

the following formula is obtained instead of Formula 8:

$$x = yz \quad (8a)$$

Figure 4:
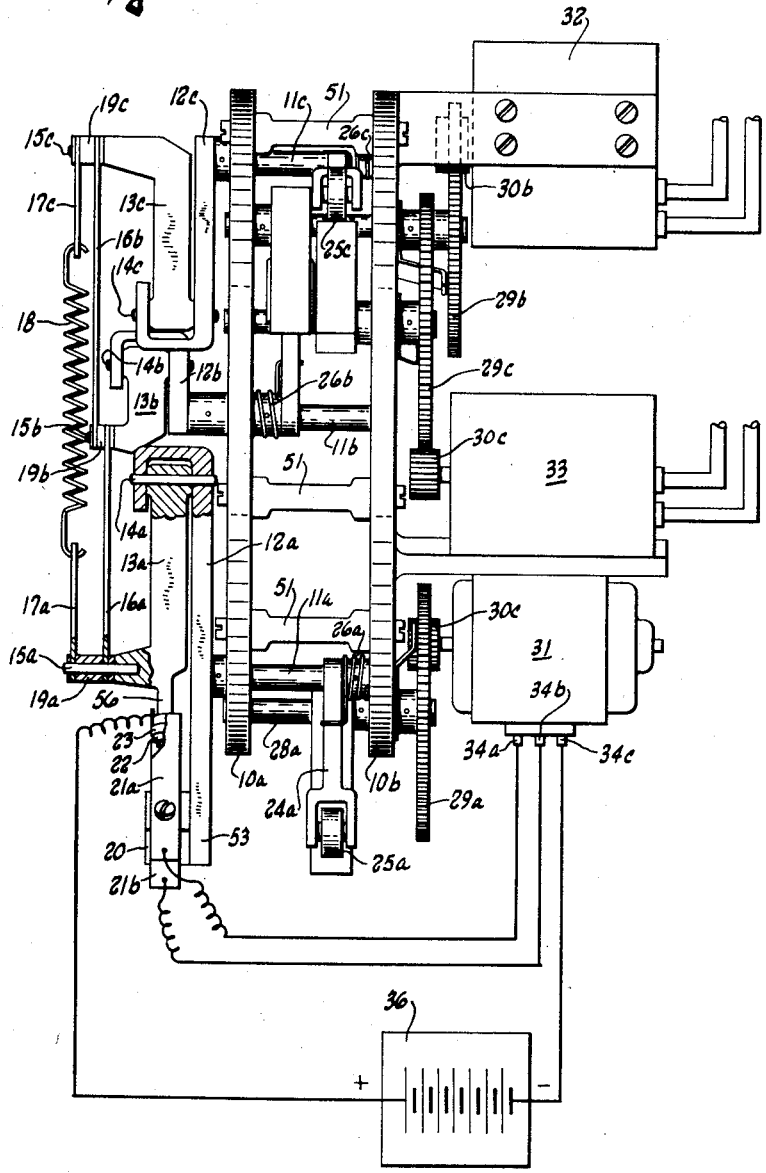
Figure 4 is an elevational view of the computer shown in Figure 3 taken along the line 4—4 in Figure 3.

In the embodiment of the invention shown in Figures 3 and 4 the computer likewise embodies a triangle which is suspended for rotation to and from a state of equilibrium. However, the turning angle $x$ of such rotary movement of the triangle is a predetermined function of the ratio between two gas or liquid pressures $P_1$ and $P_2$, which exist at each of two pressure measuring locations.

In this embodiment of the invention the central geometric figure or triangle is supported by a frame 10 comprising two concentric plane rings 10a and 10b joined together in parallel relationship by spacers 51 which are fastened between the rings by screws. The frame supports three setting members respectively consisting of the shafts 11a, 11b and 11c and brackets 12a, 12b and 12c rigidly connected to the shafts. The shafts 11a, 11b and 11c are journaled in the rings 10a—10b for rotation on circumferentially equispaced axes equidistant from but parallel to the common axis of the rings, and the brackets extend inwardly of the rings, generally toward their common axis. Further, three guide members are provided each overlying one of the setting member brackets, and respectively consisting of the arms 13a 13b and 13c, and pivot pins 14a, 14b and 14c each fixed in the inner end portion of one of the arms. The pivot pins 14a, 14b and 14c are freely journaled in the inner end portions of their respective setting member brackets 12a, 12b and 12c so as to rotate relative thereto on axes parallel to those of the shafts 11a, 11b and 11c.

Fixed in the outer end portions of the respective guide members or arms are pivots 15a, 15b and 15c, extending parallel to the pivot pins 14a, 14b and 14c. The center-to-center distances between the pivot pins 14a—14b—14c and their respective pivots 15a—15b—15c and shafts 11a—11b—11c are exactly the same, so that in swinging around the pivot pins 14a, 14b and 14c each of the arms 13a, 13b and 13c can take a position such that all of the pivots 15a, 15b and 15c thereof will be simultaneously coaxial with their respective shafts 11a, 11b and 11c. When all of the pivots 15a, 15b and 15c are exactly coaxial with shafts 11a, 11b and 11c they are said to be in their neutral positions.

Pivotally connected at its ends to the pivots 15a and 15b is a rigid link 16a, while an identical rigid link 16b is pivotally connected at its ends to the pivots 15b and 15c. The shaft pivots 15a and 15c also pivotally support shorter links 17a and 17c having a loaded tension spring 18 connected between their adjacent ends. Links 16a, 16b, 17a, 17c and the spring 18 thus in effect form a central geometric figure in the shape of a triangle, similar to the triangle described in connection with the embodiment of the invention illustrated in Figures 1 and 2.

The length of the links 16a and 16b are so chosen that if by swinging of the guide member arm 13a, the shaft pivot 15a is set in its neutral position, the pivot 15b will also be caused to take its neutral position.

At their junction points, which correspond to the apexes of the triangle, the links 16a and 16b are spaced from each other and from the shorter links 17a and 17c by tubular spacers 19a, 19b and 19c, which, if desired, may be threaded on the pivots 15a, 15b and 15c.

The setting member bracket 12a has an extension 53, projecting outwardly beyond shaft 11a, to which an indicating means is attached. The indicating means consists of a block of insulating material 20 and two contact springs 21a and 21b rigidly connected to opposite surfaces of the block and thereby electrically insulated from each other and from the bracket 12a. The contact springs preferably have contacts 54 and 55 fixed thereto and spaced from one another circumferentially of the adjacent ring 10a.

The guide arm 13a, which overlies the bracket 12a, also has an extension 56 projecting outwardly therefrom to overlie the extension 53 of its bracket and to extend between the contact springs 21a and 21b. The outer end of the extension 56 has an insulating sleeve 22 fixed thereto, and a contact ring 23 is externally clamped on the insulating sleeve so as to be electrically insulated from the arm 13a. This extension 56 of the arm 13a is further so designed that the contact ring 23 will move toward engagement with one or the other of the contacts 54—55 when the arm 13a swings upon its pivot pin 14a. The dimensions are further so chosen that the contact ring 23 lies substantially half-way between the contacts 54—55 on the contact springs 21a and 21b when the arm 13a assumes its neutral position. The dimensions are further so chosen that the contact ring 23 abuts one or the other of the contacts on the contact springs 21a and 21b if the arm 13a swings but a short distance to either side of its neutral position. Electric contact is thereby established between the contact ring 23 and one of the contact springs 21a and 21b, and when this occurs, the movement of the arm 13a is also mechanically stopped.

Respectively fixed to the shafts 11a, 11b and 11c and projecting therefrom in directions outwardly of the frame rings are followers in the form of arms or levers 24a, 24b and 24c, upon the outer ends of which are journaled rollers 25a, 25b and 25c. Torsion springs 26a, 26b and 26c are mounted on the frame and respectively act upon the levers in directions tending to turn them and their respective shafts clockwise (as seen in Figure 3), to maintain the rollers thereon engaged with the run surfaces of cam discs 27a, 27b and 27c respectively secured to shafts 28a, 28b and 28c journaled in suitable bearings in the frame rings 10a and 10b to swing on axes intermediate the shafts 11a—11b—11c. The shafts 28a, 28b and 28c respectively have gears 29a, 29b and 29c fixed thereto, beneath the frame ring 10b. Respectively meshing with the gears 29a, 29b and 29c are smaller gears 30a, 30b and 30c, which in turn are respectively rigidly fixed to the drive shaft of an electric motor 31, serving as servo motor, to a first manometer 32, and to a second manometer 33. The motor 31 and the manometers 32 and 33 are attached to the ring 10b by suitable brackets.

The motor 31 is a reversible direct current type and has two positive terminals 34a and 34b and a negative terminal 34c. As is well known, the motor runs in one direction when its terminals 34a and 34c are connected with a source of E.M.F. and will run in the opposite direction when its terminals 34b and 34c are connected with the source of E.M.F. By way of example, the source of E.M.F. is shown as a battery 36, the negative terminal of which is electrically connected to the terminal 34c and the positive terminal of which is connected to the contact ring 23. The terminal 34a is connected to the contact spring 21a and the terminal 34b is connected to the contact spring 21b. The motor 31, of course, may be employed to set the gear 29a at a selected angle $x$ which can be read off on a scale engraved in the gear against a pointer 35a fixed to the adjacent frame ring 10b.

The manometers 32 and 33 are each assumed to be of a known type and therefore need not be herein described in detail. By tube connections to the two mentioned pressure measuring locations, not shown, the manometers 32 and 33 are assumed to receive a gas or liquid pressure of a value which can be referred to as $P_1$ and $P_2$. The manometers will thereby effect setting of the gears 29b and 29c at angles $y$ and $z$ respectively, which can be read off on scales engraved in the respective gears against fixed pointers 35b and 35c cooperating therewith.

In operation, the motor 31 always tends to set the bracket 12a, through the medium of the gears 29a and 30 and the cam transmission 24a—25a—27a, at such an angle that the pivot 15a will take its neutral position of coaxiality with the shaft 11a. If divergencies of importance from this neutral position occur, the contact ring 23 will abut one or the other of the contacts on the contact springs 21a and 21b. When that occurs, the motor 31 will be caused to run in the opposite direction, tending to correct the angle setting of the bracket 12a. Should the pivots 15b or 15c be displaced from their neutral positions as a consequence of response by either of the manometers 32 or 33 to pressure change, which would displace the brackets 12b or 12c through the medium of the gears and cam transmissions associated therewith, the motor 31 will carry out its corrective movement of the arm 12a just the same.

From this it will be seen that the same geometric force calculations referred to with respect to the triangle 6a—8 in the embodiment of the device shown in Figures 1 and 2 are directly applicable to the corresponding triangle 15a—18 in the embodiment shown in Figures 3 and 4; the only difference being that the resultant forces at the suspension points of the triangle are absorbed by reactions in the form of tension forces in the guide member threads 5a—5c in the first instance and in the form of pressure forces in the guide members 13a—14c in the latter case. This, however, does not alter the force ratio when the suspension points of the triangle take their netural positions.

Referring to the Figure 2 diagram, for the sake of comparison, the corner angles and the setting angles of the setting members employed in the computer shown in Figures 3 and 4 are defined in the following tables:

A=the axis of the shaft 11a
B=the axis of the shaft 11b
C=the axis of the shaft 11c
A″=the axis of the pivot pin 14a
B″=the axis of the pivot pin 14b
C″=the axis of the pivot pin 14c (Points A″, B″ and C″ might be considered as lying on the resultants $R_A$, $R_B$ and $R_C$ in Figure 2, at equal distances from the rings 6a, 6b and 6c.)

$\alpha_0$=the angle CAB
$\beta_0$=the angle ABC
$\gamma_0$=the angle BCA
$\alpha$=the angle CAA″
$\beta$=the angle ABB″
$\gamma$=the angle BCC″

The Equation 4 is available if the pivot 15a takes its neutral position. According to this presumption, the following relation is further available for the Figure 3-4 embodiment:

$$x = f_1(P_1/P_2) \quad (9)$$

or $$P_1/P_2 = f_2(x) \quad (10)$$

where $f_2$ is the inverse function of the given function $f_1$. The further relation also exists:

$$P_1 = f_1(y) \quad (11)$$

$$P_2 = f_2(z) \quad (12)$$

where $f_1$ and $f_2$ are calibrating functions for the manometers 32 and 33.

The cam discs 27a, 27b and 27c are assumed to have such curved peripheral shapes that the following ratio is obtained between the setting angle $\alpha$, $\beta$ and $\gamma$ and the corresponding setting angle $x$, $y$ and $z$ of the gears 29a, 29b and 29c as designated by the pointers 35a, 35b and 35c.

$$F_2(x) = \frac{\sin \alpha}{\sin (\alpha_0 - \alpha)} \quad (13)$$

$$f_1(y) = \frac{\sin (\beta_0 - \beta)}{\sin \beta} \quad (14)$$

$$f_2(z) = \frac{\sin \gamma}{\sin (\gamma_0 - \gamma)} \quad (15)$$

The Equations 10 to 15 together satisfy the Equation 4. The embodiment shown in Figures 3 and 4 will thereby operate according to the Equation 9 and the prescribed rotational movement can be derived from the gear 29a or the shaft 23a.

Figure 5:
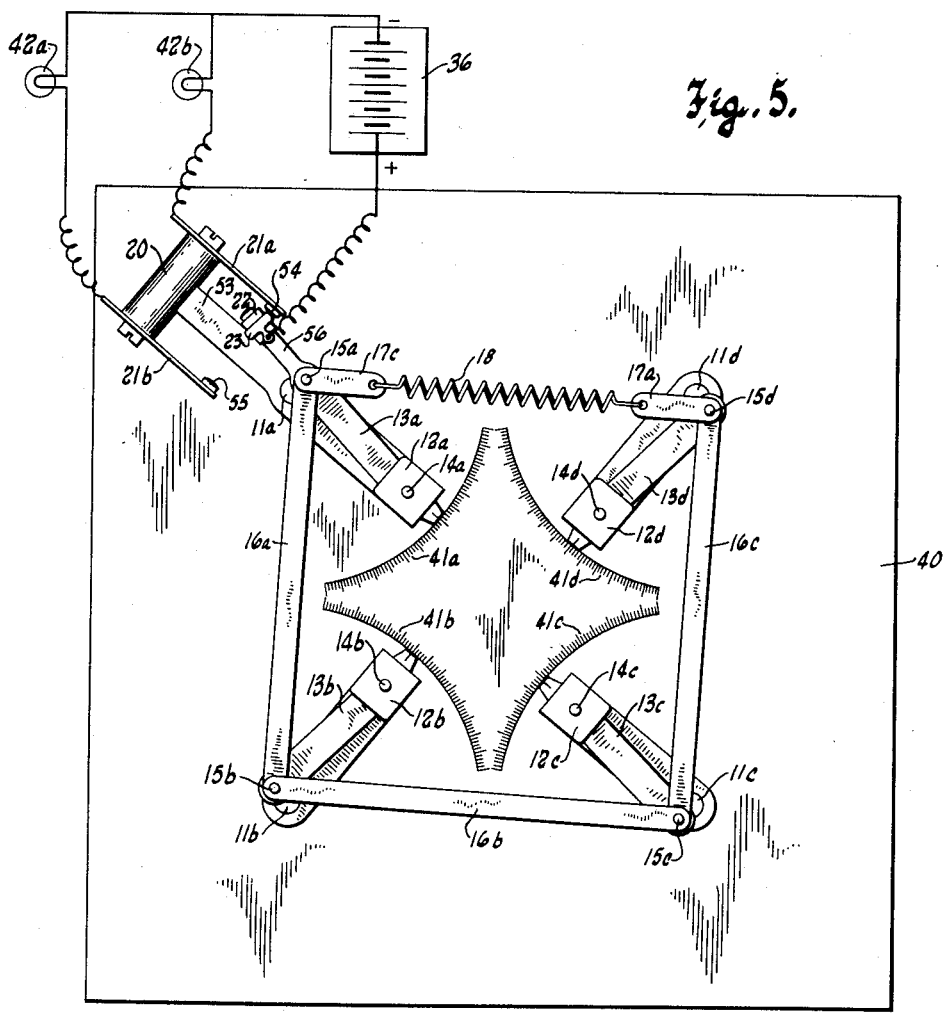
Figures 5 and 6 illustrate two other embodiments of the invention.

The embodiment of the invention shown in Figure 5 can be employed to indicate if four manually settable values or variables satisfy the relation $xyzu = 1$.

The structure and operation of the Figure 5 embodiment corresponds substantially entirely to that of the parts 11a—23 of the embodiment shown in Figures 3 and 4, with the exception that one more setting member, guide member and link have been added to convert the triangle to a square. These added parts are denoted by the same numerals as the corresponding parts of the Figure 3 structure, with the addition of the letter $d$ thereto. A complete description of the Figure 5 device would thus be superfluous, wherefore only the differences will be discussed.

The shafts 11a, 11b, 11c and 11d are journaled in a frame 40 consisting of a plane plate, rather than rings. The variables $x$, $y$, $z$ and $u$ are manually set by swinging the brackets 12a, 12b, 12c and 12d, and the numerical values of the different variables can be read off by means of pointers rigidly fixed to the inner ends of the brackets and cooperating with scales 41a, 41b, 41c and 41d engraved on the top side of the frame, internally of the square. The contact ring 23 is electrically connected to the positive terminal of the battery 36. The contact springs 21a and 21b are connected to each of two indicating lamps 42a and 42b which also are connected to the negative terminal of the battery.

In the same way as the Equation 4 was derived, the following relation now obtains:

$$\frac{\sin \alpha}{\sin (\alpha_0 - \alpha)} \cdot \frac{\sin \beta}{\sin (\beta_0 - \beta)} \cdot \frac{\sin \gamma}{\sin (\gamma_0 - \gamma)} \cdot \frac{\sin \delta}{\sin (\delta_0 - \delta)} \quad (16)$$

where $\delta_0$ and $\delta$ are the corner and setting angles respectively for the bracket 12d.

If the scales 41a, 41b, 41c and 41d are such that Equations 5, 6 and 7 are satisfied, together with the equation, $$u = \frac{\sin \delta}{\sin (\delta_0 - \delta)} \quad (17)$$

the following formula is obtained for the neutral position:

$$xyzu = 1 \quad (18)$$

The neutral position, of course, is indicated when the two lamps 42a and 42b are extinguished. If one or the other of the lamps is lit the setting members must be corrected either by clockwise or anticlockwise rotation thereof.

In substantially the same way as in the previous embodiments, the Figure 5 device can be used to determine one of the variables $x$, $y$, $z$ and $u$ if the others are known.

By altering the Equations 5, 6, 7 and 17 and correspondingly changing the graduations of the scales, an arbitrary relation regarding the variables $x$, $y$, $z$ and $u$ can further be achieved for the embodiment shown in Figure 5 as follows:

$$f_x(x) \cdot f_y(y) \cdot f_z(z) \cdot f_u(u) = 1 \quad (19)$$

Figure 6:
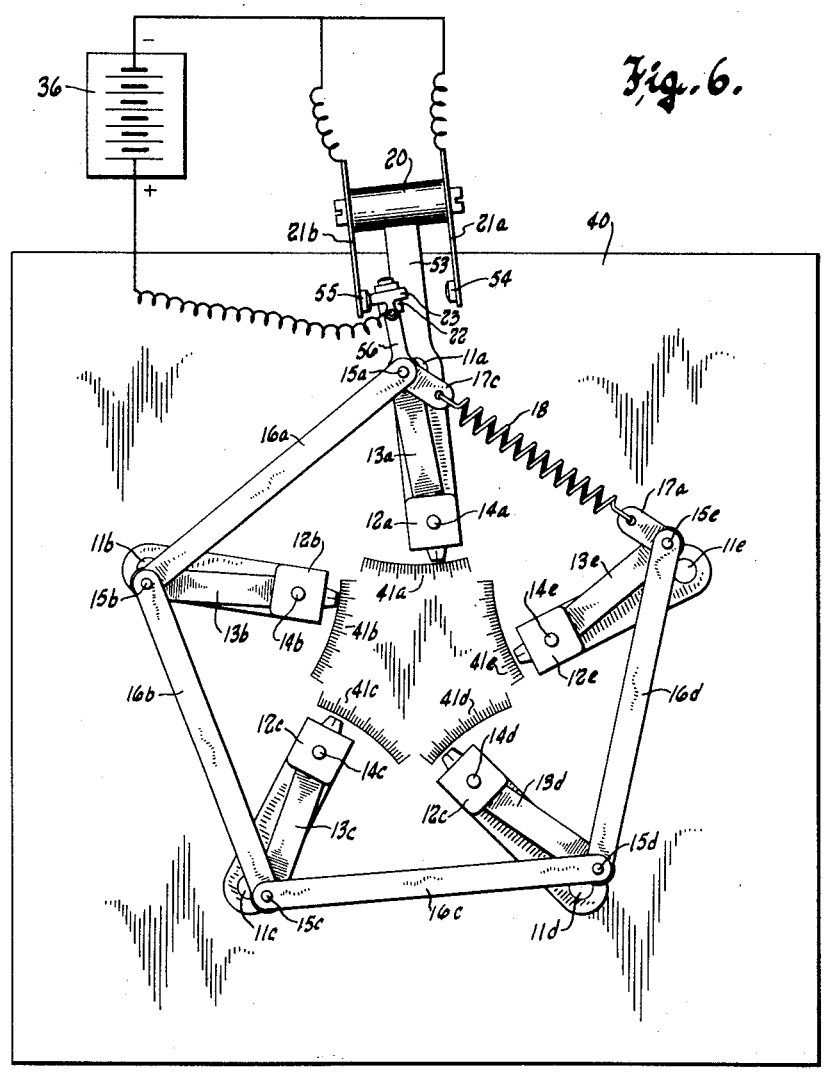

The embodiment of the device shown in Figure 6 is intended to indicate whether five variables $x$, $y$, $z$, $u$ and $v$ satisfy the relation $xyzuv = 1$. The structure, the operation and the possibilities of variations are analogous to those corresponding to the embodiment in Figure 5. The electrical connection of the indicating means may be performed in the same manner as in Figure 5, although it is not shown in Figure 6.

In addition to the described examples, the computer of this invention can be varied in several different ways if practical reasons so dictate. The described embodiments can for example be changed so as to accommodate additional variables. To this end it is only necessary to increase the number of links or threads of the central goemetric figure and to correspondingly increase the number of setting members and guide members so that the pivotal junctions between the links of the geometric figure will be at the apexes of a polygon with an arbitrarily selected number of sides, instead of a triangle, quadrangle or pentagon. The geometrical figures in question need not be equilateral, but can have arbitrarily selected corner angles, if desired.

Nor do the axes of the setting members need to be parallel to each other. The junction points between the links of the central figure, however, must then be made to allow at least small movements of the setting members, and for this purpose they can be embodied in the form of spherical joints or cardan bearings. The computer of this invention could also be constructed in such a manner that groups of the links of its central figure are in different planes forming angles with one another, or are considerably displaced but in parallel relation to each other.

The indicating means of the computer can also be provided by other means than shown in the drawings, since its only object is to indicate in a suitable manner whether the suspension points or link junctions assume their neutral positions.

Also the setting members and guide members can be varied in different ways. The important thing is only that the center of each suspension point of the chain or central geometric figure will be movable along a fixed path in relation to its respective setting member which path intersects the center point or axis about which the setting member swings. In order to obtain good accuracy of the computing device the movement of the chain or central geometric figure should be unrestricted as much as possible, and to that end, suitable bearings or rollers for guiding the suspension points or link junctions along the desired path can be employed.

Finally with respect to the chain or central geometric figure, it is not necessary that the pivots of the links be the same as the suspension points of the figure. Practical reasons may dictate a condition where said pivot points and suspension points are somewhat spaced from each other.

From the foregoing, it will be readily apparent to those skilled in the art that this invention provides a computer which can be employed either to quickly ascertain whether a predetermined mathematical relationship between a number of values or variables does or does not exist, or to determine the value of one of said values or variables if the others are known.

What is claimed as my invention is:

1. In a computing device for determining mathematical relationships between a number of selected scalable variables in excess of two: a frame; a number of links pivotally connected together at their ends to form a multisided geometrical figure having its apexes at the link pivots and equal in number to the number of variables that can be accommodated by the device, one of said links being longitudinally resilient; means movably suspending said figure above the frame, comprising elongated guide members each pivotally joined at one end to one of the link pivots, a setting member pivotally connected to the other end of each guide member, and means on the frame supporting said setting members for motion relative thereto along separate arcuate paths whereby said guide members and their associated setting members cooperate to control the motion of said geometrical figure relative to the frame, one of said setting members and its associated guide member being adapted to constrain the link pivot to which said one guide member is connected to move along a fixed path such that in a neutral position of said designated link pivot its axis intersects the center of curvature of the arcuate path along which the associated setting member travels, and the lengths of the links of said figure being so chosen that the axes of all the link pivots will simultaneously occupy neutral positions intersecting the centers of curvature of the paths of their associated setting members if the axis of one of said link pivots does; and indicating means arranged to indicate the positions of the axes of the link pivots relative to the centers of curvature of the paths of their associated setting members.

2. The computing device of claim 1, further characterized by the fact that the indicating means is an electrical signalling device which is operated as a consequence of movement of the link pivots out of their neutral positions.

3. The computing device of claim 2 further characterized by the fact that the indicating means consists of an electric switch which is actuated in consequence of motion of said geometrical figure.

4. The computing device of claim 3 further characterized by the provision of auxiliary setting means movably mounted on the frame and having a motion transmitting connection with one of the setting members such that the latter is so positioned by the auxiliary setting means as to be set thereby at an angle which is a predetermined function of the setting of the auxiliary setting means.

5. In a computing device for determining mathematical relationships between a given number of scalable variables in excess of two, the combination of: a frame; a setting member for each of the variables that can be accommodated by the computing device; means supporting each setting member from the frame for movement around and concentric to an axis fixed with respect to the frame; means providing for setting each setting member at an angle that is a predetermined function of one of said variables; an endless chain comprising a number of articulated links, one of which is elastically resilient in its longitudinal dimension; a guide member for each setting member, each said guide member connecting its setting member with the chain at a suspension point fixed on the chain and constraining said suspension point to travel along a short path which is immovable in relation to said setting member and so located that said suspension point, when in a neutral position in said path, is coincident with the said axis around which the setting member moves; the distances along said endless chain between any two adjacent suspension points being such that all of the suspension points will occupy their neutral positions if one of them does; and indicating means arranged to indicate whether or not said suspension points are in their neutral positions.

6. The computing device of claim 5 further characterized by the fact that the guide members consist of rigid arms each pivotally mounted on one of the setting members.

References Cited in the file of this patent

UNITED STATES PATENTS

| | | |
|---|---|---|
| 2,551,440 | Kreitner | May 1, 1951 |
| 2,668,444 | Berman | Feb. 9, 1954 |